Nov. 3, 1936.  R. D. SMITH  2,059,973

AUTOMATIC WHEEL ALIGNER

Filed June 17, 1935  2 Sheets-Sheet 1

ROY D. SMITH  INVENTOR.

BY Merrill M. Blackburn.

ATTORNEY.

Nov. 3, 1936.　　　　　R. D. SMITH　　　　2,059,973
AUTOMATIC WHEEL ALIGNER
Filed June 17, 1935　　　2 Sheets-Sheet 2

ROY D. SMITH INVENTOR.

BY
Merrill M. Blackburn
ATTORNEY.

Patented Nov. 3, 1936

2,059,973

UNITED STATES PATENT OFFICE 2,059,973

AUTOMATIC WHEEL ALIGNER

Roy D. Smith, Davenport, Iowa, assignor to Bee Line Manufacturing Company, Davenport, Iowa, a corporation of Iowa Application June 17, 1935, Serial No. 27,135

11 Claims. (Cl. 280—90)

The present invention relates to an improvement in motor vehicle construction and more particularly to the tie-rod assembly of the steering mechanism. Among the objects of this invention are to provide an apparatus which will function automatically to maintain a proper relationship between the steering wheels of a moving motor vehicle; to provide an apparatus of the character indicated which will function normally to cause proper coordination of the steering wheels during the act of steering and will yet permit relative motion thereof as necessitated by varying conditions of speed, road surface, etc.; and such further objects, advantages, and capabilities as will hereafter appear and as are inherent in the construction disclosed herein. My invention further resides in the combination, construction, and arrangement of parts illustrated in the accompanying drawings and, while I have shown therein two embodiments of my present invention, I desire the same to be understood as illustrative only and not to be interpreted in a limiting sense.

In the drawings annexed hereto and forming a part hereof,

Figure 1:
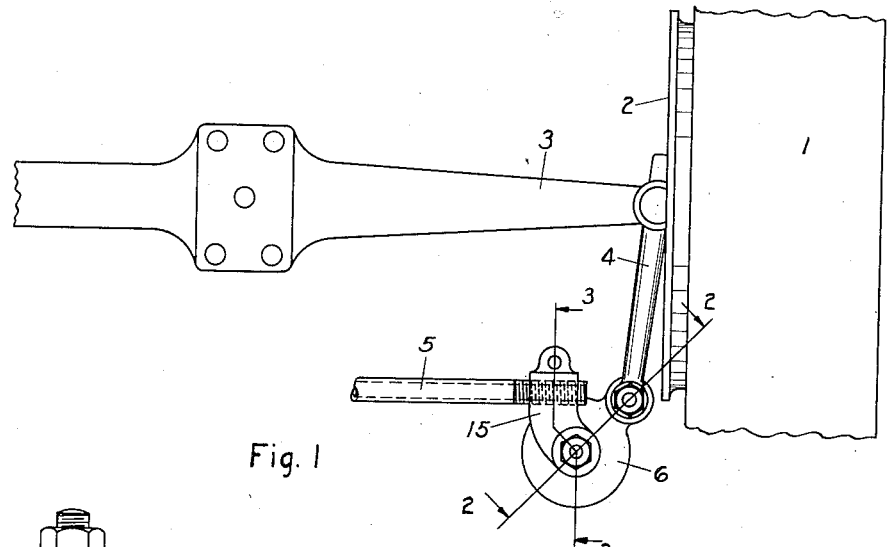
Fig. 1 represents a fragmentary plan view showing the right hand end of the axle and tie-rod assembly connected to the right hand front wheel.

Reference will now be made in greater detail to the annexed drawings for a more complete disclosure of this invention. The tire is denoted by the numeral 1, the brake drum by the numeral 2, and the axle by the numeral 3. A crank arm 4 is connected to the spindle of the wheel for the purpose of turning this wheel about its king pin during the operation of steering the vehicle. The connection of the tie-rod 5 to the crank arm 4 is modified somewhat, and it is in this connection that my invention resides. A hollow body 6, preferably, although not necessarily, cylindrical in form, is shown as being provided at its lower end with screw-threading whereby the cap 7 may be secured to said body 6. This cap is provided with a centrally arranged hollow boss 8 which serves as a bearing for the shaft or spindle 9. A hollow boss 10 extends upwardly from the body 6 and is screw-threaded for the reception of the cap 11, between which and the boss 10 is packing 12 which serves to retain oil or other fluids within the body 6 and to prevent access of sand, dust, and the like, which might result in excess wear within the bosses 8 and 10, as well as inside of the body 6. The shaft or spindle 9 has a bearing in the upper boss 10, comparable to the bearing in the lower boss 8.

As shown at 13, the upper end portion of the shaft 9 is reduced and screw-threaded and, between this and the body of the spindle, there is a tapered portion 14 for reception of an end of the bracket 15. This bracket is held in place on the portion 14 by the nut 16, engaging the threaded portion 13. When this nut is screwed down tightly, the crank arm 15 is rigidly engaged with the spindle and will not move with relation thereto unless the nut 16 becomes loosened. A key 14a connects the shaft 9 and arm 15, thus insuring against relative motion between these parts and assuring proper setting of the parts.

Figure 4:
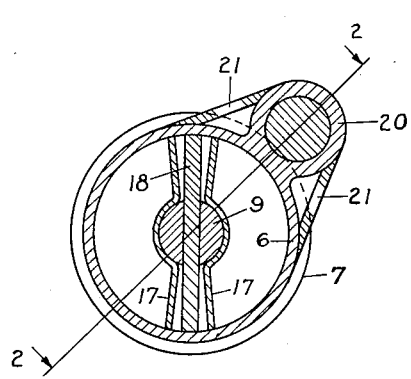
Fig. 4 represents a transverse section substantially along the broken plane indicated by the line 4—4, Fig. 2.

A pair of partitions 17 are shaped at their middle portions to closely encircle the shaft 9 and, at their ends, they are rigidly attached to the side wall of the body 6. They may be soldered, brazed, or otherwise suitably secured to the body 6, but the union, like that with the top wall of the body, should be substantially oil-tight. The partitions 17 may, if thought desirable, be cast integral with the body 6, and the vane 18 may be formed integral with the shaft 9. As shown in Fig. 4, these ends are spread laterally away from the vane or piston 18 to form a somewhat wedge-shaped or V-shaped opening at each of two opposite sides of the shaft 9. This arrangement is shown in Fig. 4. It is considered preferable to pass the vane 18 through an opening in the shaft 9 or it may, if considered desirable, be secured to said shaft. The operation will be described hereinafter.

Figures 2, 3:
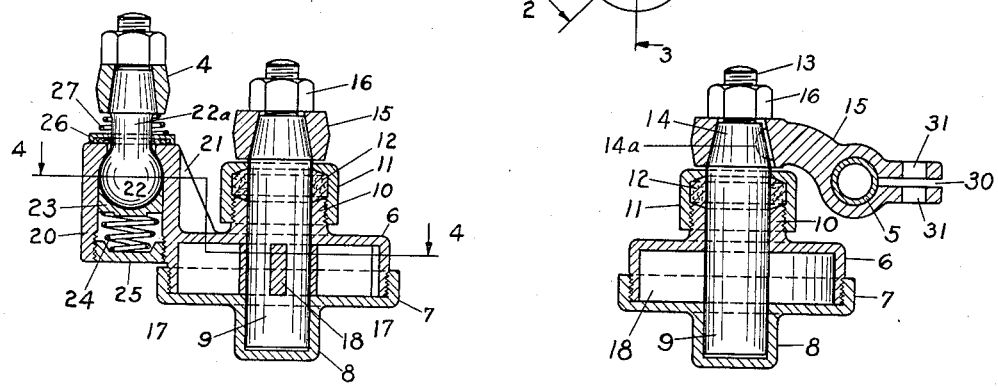
Fig. 2 represents a vertical section substantially along the plane indicated by the lines 2—2, Figs. 1 and 4.
Fig. 3 represents a transverse section substantially along the broken plane indicated by the line 3—3, Fig. 1.

A projection 20 is formed on or secured to one side of the body 6 and has an approximately cylindrical opening therein. Braces 21 connect the projection 20 to the body 6 and help to increase the rigidity of the connection of these two parts. At its upper end, the projection 20 has an opening for the reception of the shank 22a of the ball 22 which corresponds in shape with the appropriately shaped inner face of the projection in forming a ball and socket joint. A plug 23 has a concave upper face which fits the ball 22, being pressed against same by means of the spring 24 which is compressed against the plug 23 by means of the plug 25 screwed into the lower end of the opening, as shown in Fig. 2. A washer 26, hollow on its under side, has a suitable packing material in this hollow which is pressed against the top of the projection 20 and fits tightly against the shank 22a to prevent dust and the like from getting in to cause undue wearing of this bearing. A spring 27, between the arm 4 and the washer 26, forces the washer tightly against the end of the projection and thus causes a satisfactory seal.

As shown in Fig. 3, the bracket 15 is split, as indicated at 30, and the two arms are provided with openings 31 through which a bolt may be passed to draw these arms together whereby to clamp this bracket to the connecting rod 5 of the tie-rod assembly. A key may be provided to connect the shaft 9 and the bracket 15 so as to prevent relative rotation thereof, but it is not considered necessary to provide such a key for preventing rotation between the arm 4 and the shank 22a. There is not sufficient force tending to cause relative movement between these two parts so that it is necessary to provide against the same.

*Operation*

The open spaces in the body 6, including the spaces between the partitions 17 and the vane 18, having been filled with oil, grease, or other viscous fluid or semi-fluid, and the tie-rod assembly having been installed in a vehicle, the vehicle is now ready for operation. If the vehicle is travelling straight ahead, the steering wheels are normally parallel or tend to assume a parallel position because of the side thrust on pneumatic tires due to toe-in or toe-out. However, if one of the wheels strikes an obstruction tending to cause it to deviate from its normal path, one of the crank arms will be turned and will cause a slight turning motion of the body casing 6 about the shaft 9. If we assume that it is the right hand wheel 1 which strikes the obstruction and is thrown out of its course, we may assume that the other wheel continues to run in its normal course and that the tie-rod 5 does not shift longitudinally. Therefore, the bracket 15 will maintain its position and will hold the vane 18 fixed. If the crank arm 4 causes the casing 6 to rotate about the shaft 9, then the partitions 17 will move with respect to the vane 18, increasing the capacity of part of the spaces and decreasing that of the other spaces. Since there is a fixed capacity for the fluid, the fluid will be forced to pass above or below the vane 18 from one side to the other. By adjusting the cap 7 longitudinally of the body 6, the vane 18 may be caused to fit more or less closely the inside faces of the cap and the body. It is evident that if the cap is screwed off somewhat, the open space for the passage of the fluid will be increased, whereas, if the cap is screwed on farther, this space will be decreased, with a consequent change in the rate of flow of the fluid past the vane 18.

It is preferred to use a more or less viscous oil for the filling of the body 6 and to adjust the flow space between the vane 18 and the upper and lower faces of this casing in accordance with weather conditions. It is apparent that, when the weather is warm, not so much space will be needed as when the weather is colder. Since this structure is made practically leak-proof, substantially no oil will leak therefrom during the ordinary life of the vehicle, but a fitting, such as a "Zerk" or an "Alemite", may be attached to the body so that fluid may be forced in to take the place of any which may have leaked out. It is apparent from the foregoing that the two wheels, during normal steering of the vehicle, will move together but that they are capable of independent motion when such is necessitated by the striking of obstructions or due to other causes. For example, the character and shape of the road surface may necessitate a certain amount of relative movement between the two wheels. This is permitted by the apparatus which gives a certain amount of flexibility between the wheels which is not permitted by the ordinary rigid construction. Another occasion for relative movement between the wheels is when making a right or left hand turn. This structure permits relative shifting between the wheels so that neither one will tend to cause the other one to slip sidewise.

It is obvious from the foregoing that the wheels will be permitted to have a certain freedom of motion with relation to each other but that the rate of motion will be slow owing to the necessity for the fluid to pass through a small opening or openings in order that there may be this relative movement. At any rate, the use of this device will reduce the amount of tire wear due to side slipping of one or both tires.

Figure 5:
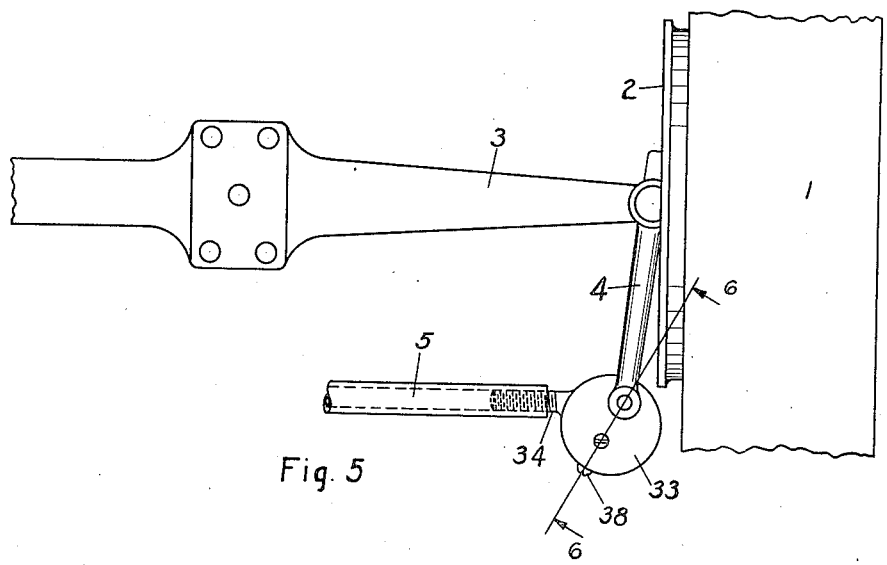
Fig. 5 is a view comparable to Fig. 1 but showing another embodiment of my present invention.
Figure 6:
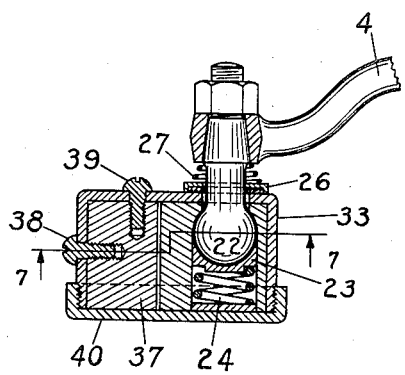
Fig. 6 represents a section taken substantially along the plane indicated by the line 6—6, Fig. 5.
Figure 7:
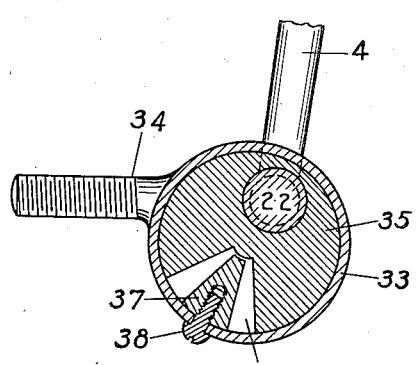
Fig. 7 represents a section taken substantially along the broken plane indicated by the line 7—7, Fig. 6.
Figure 8:
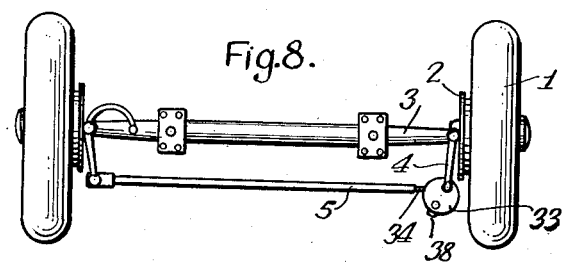
Fig. 8 represents a plan view of the entire axle and tie rod assembly.

The difference between the structures shown on Sheets 1 and 2 of the drawings will next be described. In the construction of Figs. 5 to 7, inclusive, a body or casing 33 replaces the casing 6 of Figs. 1 to 4, inclusive, but the two function in a similar manner. This casing 33 has a screw-threaded stem 34 extending laterally, substantially horizontally, for connection with the tie-rod section 5. If the rod 5 be internally or externally screw-threaded, the stem 34 will be correspondingly threaded, either externally or internally, so that the two may be connected. Within this casing is mounted an approximately cylindrical oscillatory vane 35 having a somewhat wedge-shaped opening 36 formed therein for the reception of the wedge-shaped partition 37, held in place by means of the screws 38 and 39. The wedge-shaped partition 37 corresponds to the partitions 17 of the previously described construction.

The size of the opening through the casing 33, through which the shank 22a of the ball 22 extends, is sufficiently large to permit the necessary movement of this shank with relation to the casing. It is apparent that as the ball 22 and its shank move, the vane 35 is caused to move therewith so that the relative sizes of the parts of the opening 36 are varied, the fluid therein being forced to pass between the wedge 37 and the vane 35 or between the wedge 37 and the cap 40, if this latter is screwed off somewhat so as to make an opening between the wedge and cap. It is apparent that the operation of this construction is substantially the same as that described above in connection with Sheet 1.

Besides reducing tire wear, this device provides semi-automatic steering control and minimizes the danger of accident from tire blow-out or mechanical failure due to broken parts, such as king pins, springs, or wheel bearings. Road tests have proven that the toe-in of the front wheels should be considerably different for different road conditions, for different air pressures, and for the varying speeds at which motor vehicles are driven. If given an opportunity to do so, the front wheels will automatically align perfectly and in accordance with the conditions which are constantly changing as the car is being driven.

It has been proven by actual road tests that if an automobile is equipped with this invention and there is a sudden tire failure due to a blow-out, there will be automatic and almost immediate accommodation for the changed condition of tire inflation and the driver will be enabled to maintain control of the car as easily as if all the tires were properly inflated. Also, since the front wheels are self-adjusting for running alignment conditions, there can be no shimmy or road shock in the steering system as it is agreed by automotive engineers that no car will develop an oscillating shimmy movement if the wheels are in perfect alignment.

It will of course be understood that the specific description of structure set forth above may be departed from without departing from the spirit of my invention as set forth in this specification and the appended claims.

Having now described my invention, I claim:

1. In a tie-rod assembly for a motor vehicle, a connecting unit for connecting the rod and a crank arm, said connecting unit comprising a casing having fixed partition walls and a rotary vane therein, the casing, partition walls, and vane defining compartments of variable size, said compartments being connected by at least one opening of variable carrying capacity and being filled with a fluid which flows slowly through said opening to permit slow relative movement of the vane and partition walls.

2. In a motor vehicle steering mechanism, a pair of crank arms to be connected to the steering wheels of a vehicle, a tie-rod connected to one of the crank arms and a connector unit connecting the rod to the other crank arm, said connector unit comprising a container and fixed partition walls therein, and a vane having limited oscillatory motion, walls of the vane cooperating with the fixed partition walls in regulating the rate of rotation of the vane, and fluid within the container to be forced through an opening by the relative motion of the vane and partition walls.

3. A structure as defined by claim 2 in which the partition walls extend across the interior of the container and the vane oscillates between them.

4. A structure as defined by claim 2 in which the partition walls are arranged in a V-shape with relation to each other and the vane has a V-shaped notch therein receiving the partition walls, the V-shaped notch being of a size sufficient to permit relative oscillation between the partition walls and the walls of the notch.

5. A structure for the purpose indicated comprising a tie-rod assembly for connecting the crank arms of the steering mechanism of a motor vehicle, said tie-rod assembly comprising a rod and yielding means for connecting the rod and one of said crank arms, said yielding means comprising a container and an oscillatory body, one of the last named parts having a restricted fluid containing space therein, and the other one having a vane in said space, the vane and the part defining the space being movable with relation to each other, there being an opening within the casing through which fluid within the casing may pass from one side to the other of the vane during any relative rotary motion of the vane and casing, and adjustable means for adjusting the size of the opening.

6. A tie-rod for motor vehicles, comprising a substantially cylindrical casing having separated partitions extending across the hollow of the casing and dividing said hollow into a plurality of parts, a vane oscillatable between said partitions, means connected to said vane and extending to the exterior of the casing for connection to a vehicle crank arm, and means for connecting the casing to the other crank arm of the vehicle.

7. A structure for the purpose indicated, comprising a casing having a hollow interior of substantially cylindrical form, a generally wedge-shaped block within the casing and secured to the interior thereof, and a second block oscillatably movable within the casing and fitting the interior wall thereof, said second block having a generally V-shaped notch therein for the reception of the first mentioned block, the notch being larger than the wedge-shaped block to permit relative oscillation thereof.

8. A structure as defined by claim 6 having a fixed end wall and a removable end wall, the partitions being secured to the fixed walls in fluid tight relation.

9. A structure as defined by claim 6 having a fixed end wall and a removable end wall, the partitions being secured to the fixed walls in fluid tight relation, and the removable end wall being adjustable to vary the carrying capacity of the space between said removable end wall and the partitions and vane so as to regulate the rate of flow of fluid between the parts of the casing.

10. In a tie-rod assembly, a container having a relatively movable vane therein, partition walls in the container dividing same into a plurality of compartments, the partition walls being immovable with relation to the container, the compartments being connected for slow flow of fluid from one to another, the container being connectible to one crank arm of a vehicle, and the vane to the other, the vane and container being relatively oscillatable.

11. In a tie-rod assembly, a connecting unit to be connected to a motor vehicle wheel steering crank arm and to a tie-rod, said unit comprising a vane and partition walls arranged in V-shape, the vane and the partition walls encompassing between them parts of the V-shaped opening, there being at least one opening permitting flow of a fluid between the parts of the V-shaped opening, the vane and partition walls being enclosed within a casing in which there is liquid storage space arranged laterally of said walls, and a fluid substantially filling the storage space within the container.

ROY D. SMITH.